Buford H. Funk, Jr
INVENTOR

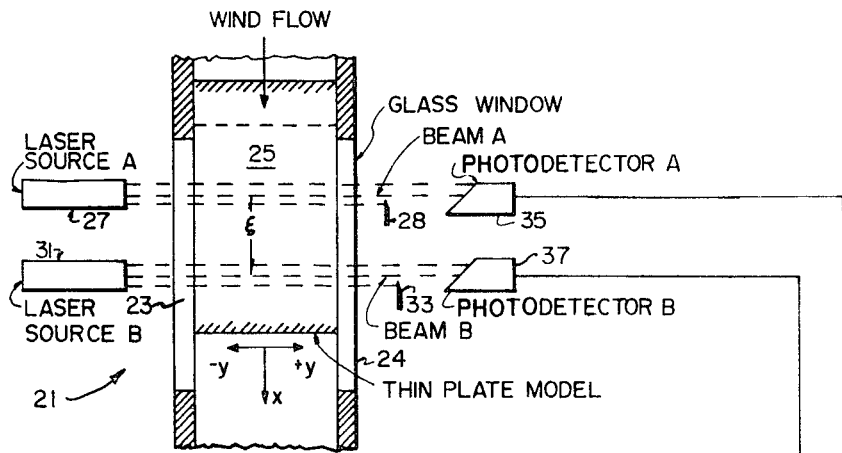
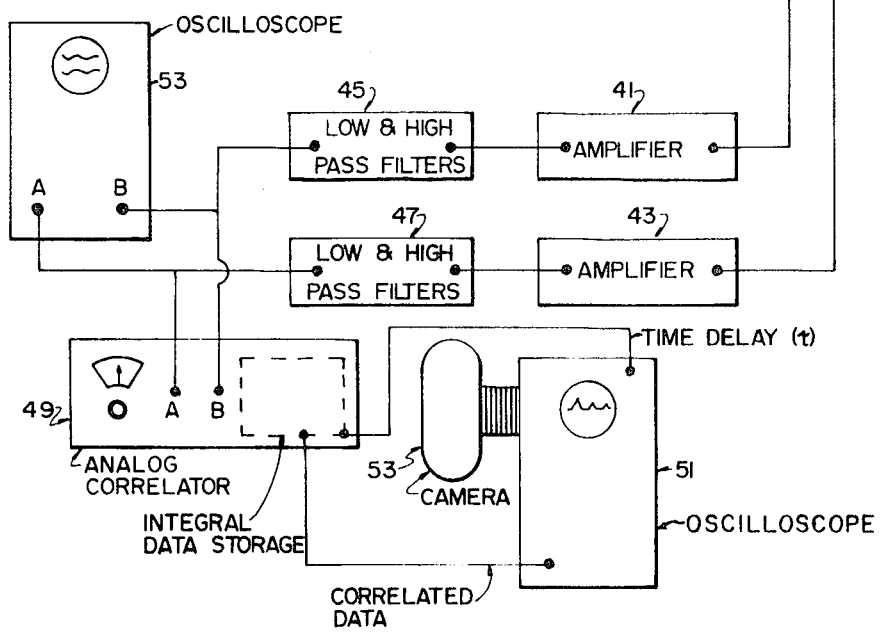
FIG. 1

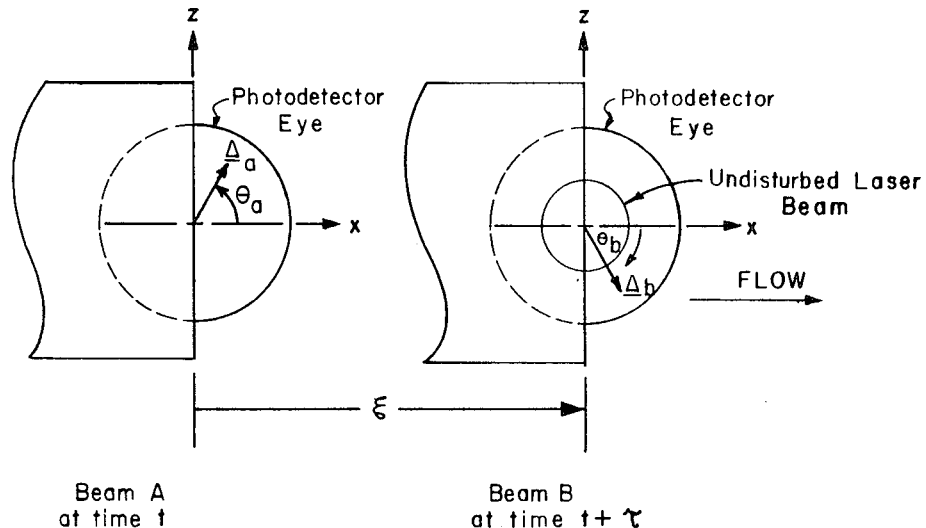
Beam A at time $t$
FIG. 3
Beam B at time $t+\tau$
FIG. 4
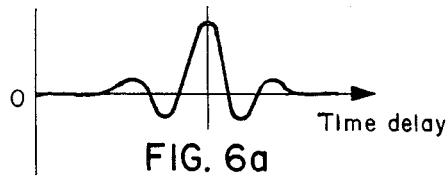
FIG. 6a
FIG. 6b
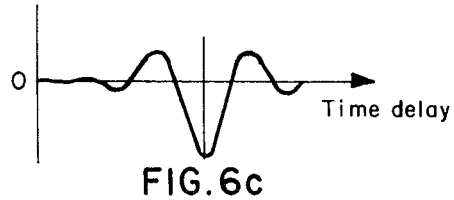
FIG. 6c
FIG. 6d
CROSS-CORRELATION
Time delay
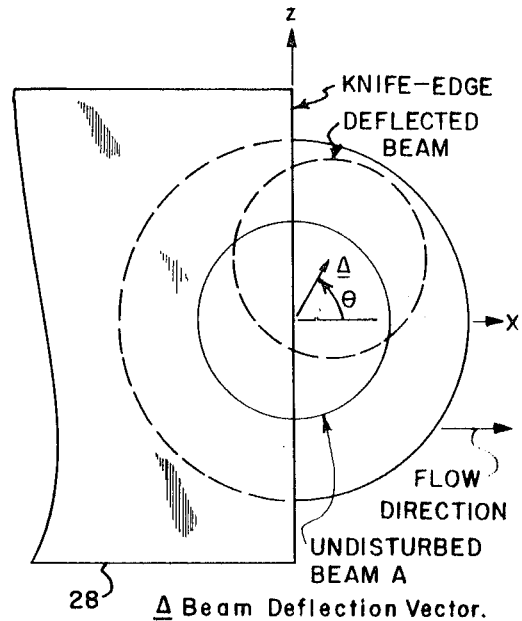
FIG. 2
Buford H. Funk, Jr.
*INVENTOR*
ATTORNEYS

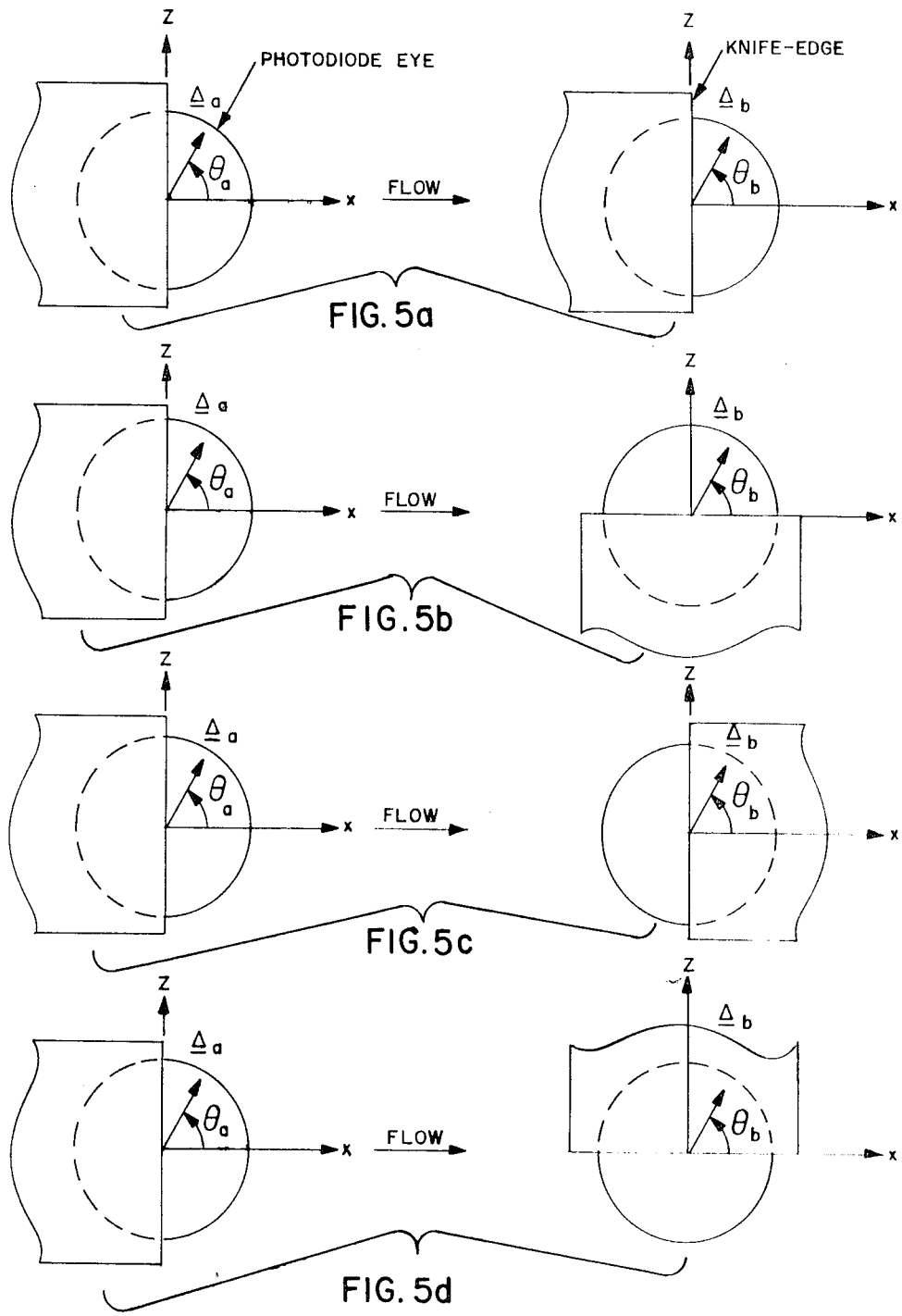

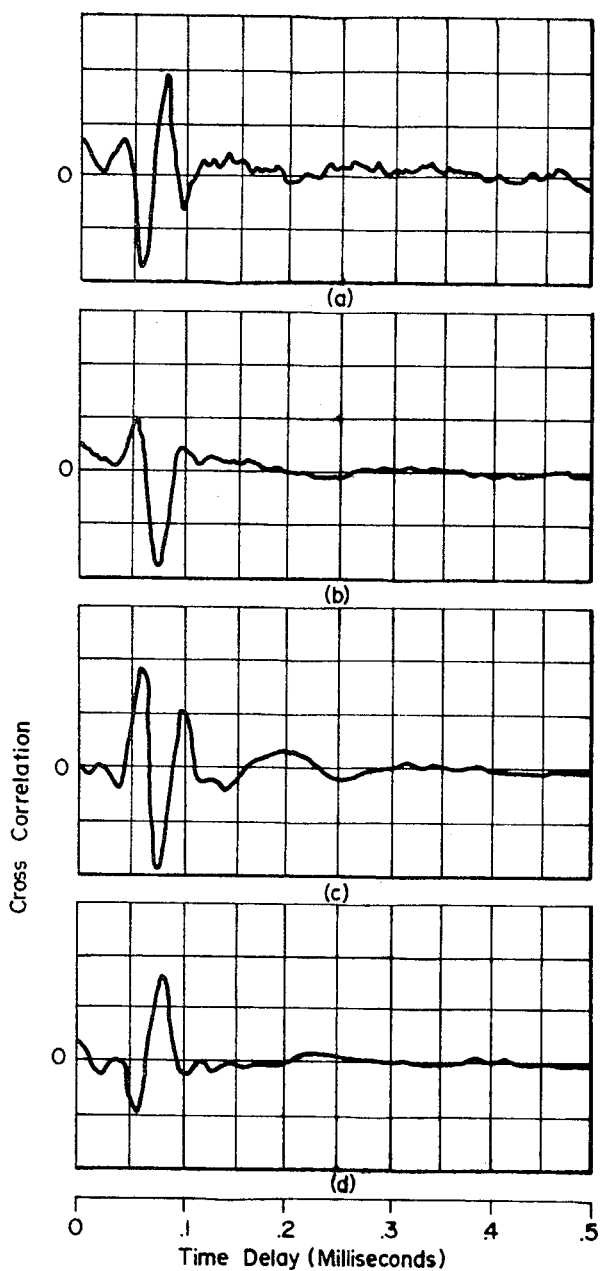
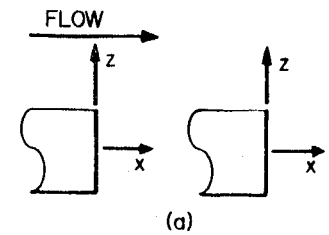
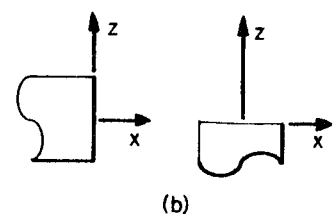
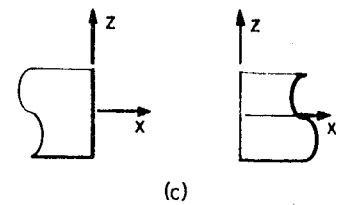
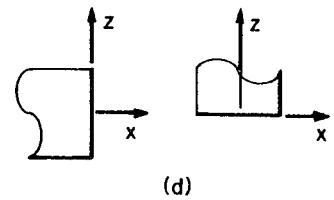
Knife-edge Arrangement
FIG. 12

United States Patent Office 3,623,361
Patented Nov. 30, 1971

1

3,623,361
OPTICAL PROBING OF SUPERSONIC FLOWS WITH STATISTICAL CORRELATION
Buford H. Funk, Jr., Huntsville, Ala., assignor to the United States of America as represented by the Administrator of the National Aeronautics and Space Administration
Filed Nov. 4, 1969, Ser. No. 873,793
Int. Cl. G01m *9/00;* G01n *21/46*
U.S. Cl. 73—147                                                14 Claims

ABSTRACT OF THE DISCLOSURE

Method and apparatus for optical sensing of supersonic flows by correlating deflections in laser beams through the flow. Deflections in the laser beams are converted into meaningful electrical signals by use of a knife-edge before a photodetector, and the knife-edge is rotatable whereby both the translational and rotational motion of turbulent flow structures may be determined.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

Field of the invention

The present invention relates to an apparatus and method for determining characteristics of flows and more specifically to means for remote sensing of supersonic turbulance by statistically correlating signals retrieved remotely with a laser schlieren system.

DESCRIPTION OF THE PRIOR ART

The majority of fluid flows encountered by the aerodynamicist are turbulent. Because of the complex nature of turbulence, the approach in the measurement of its characteristics has been through the application of statistical methods to data obtained by solid probes inserted into the fluid. However, in supersonic and hypersonic flows, these probes adversely influence the structure of the turbulence.

Recent developments have been made in the use of optical techniques to measure turbulence in regions inaccessible to standard probes. The developments of Dr. Fritz R. Krause have been shown to be of particular value in the area by the development of the "crossed beam correlation theory." In this theory, two beams of radiation are employed which traverse the entire flow field in two mutually perpendicular directions. The radiation employed is chosen so that it is either absorbed or scattered by the flow. Thus, turbulence induced fluctuations of either the thermo-dynamic properties or concentrations of the chosen property result in fluctuations in detected light intensity. Each beam reflects an integral of the fluctuations occurring along its entire path, but cross correlation of the two detected signals eliminates much of the integration yielding local turbulent properties. However, herebefore, no means were provided for separating the translational and rotational motion of the turbulent structures and the advantage of using a schlieren system to sense the deflections in the beams of light had not been discovered.

SUMMARY OF THE INVENTION

The present invention provides a reliable remote sensing tool for measuring the statistical properties of super-

2 sonic turbulence which neither affects the flow field nor is adversely affected by it. Two laser beams are directed through the supersonic boundary layer in the test section of a wind tunnel. If the layer is two-dimensional, the laser beams may be placed parallel to each other. Otherwise, the laser beams are positioned so as to restrict the volume of flow being examined to that common in both beams. It has been discovered that the turbulence crossing both beams may more easily be statistically correlated by the use of a rotatable knife-edge before the photodetector and both the most probable translational and rotational motion of the turbulent structure determined. The signals from the photodetector are correlated by a computer and the correlated data signal is inputed into an oscilloscope or other recording means for viewing.

Accordingly, it is an object of the present invention to determine the characteristics of supersonic flow by an optical system.

Another object is to provide a method and apparatus for separating the translational and rotational motion of turbulent structures in supersonic flow.

Other objects and advantages of the present invention will become more apparent from the following detailed description when taken in conjunction with the accompanying drawings.

BRIEF DESCRIPTION OF THE DRAWINGS

FIG. 1 is a schematic of an apparatus with a two-dimensional wind flow according to the present invention;

FIG. 2 is a front view of a knife-edge along the laser beam path with a view of the photodetector eye in the background;

FIG. 3 is a front view similar to FIG. 2 but showing the deflection vector of upstream laser beam at a certain time;

FIG. 4 is a front view similar to FIG. 3 but showing the deflection vector of a second laser beam downstream from the first laser beam;

FIGS. 5(*a*) to 5(*d*) are front views along a laser beam path illustrating various positions of the knife-edge relative to the photodetector;

FIGS. 6(*a*) to 6(*d*) are cross-correlograms corresponding to the knife-edge arrangements of FIGS. 5(*a*) to 5(*d*) respectively;

FIGS. 12(a) to 12(d) shows cross-correlograms retrived with the particular knife-edge arrangement adjacent thereto;

DESCRIPTION OF THE PREFERRED EMBODIMENT

Figure 7A:
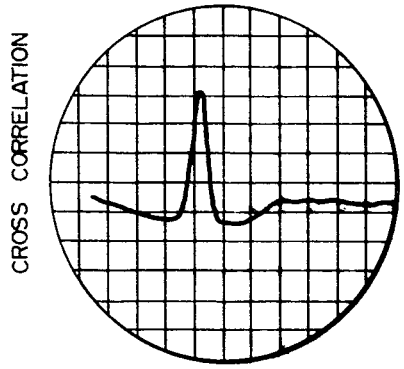
FIGS. 7(*a*) and 7(*b*) are typical cross-correlograms on an oscilloscope for the knife-edge arrangements of FIGS. 5(*a*) and FIG. 5(*c*), respectively.

Referring now to FIG. 1 wherein is illustrated a wind tunnel test section 21 having two opposed transparent windows 23, 24 with a thin plate model 25 therein for causing substantially two dimensional turbulence of the wind flow. A first laser source 27 (laser A) emits collimated beam A through an upstream path in the supersonic turbulent boundary layer which is received by a photodetector 35. A rotatable knife-edge 28 is positioned before the photodetector or photometer 35 such that about 50 percent of the light is prevented from reaching the photodetector 35. A similar second laser source 31 (laser B) emits a collimated laser beam B through a downstream path in the turbulent boundary layer which is received by a second photometer 37. A second rotatable knife-edge 33 is positioned before the second photodetector or photometer 37 so about 50 percent of the light is prevented from reaching the second photodetector 37.

Signals from photodetectors 35 and 37 which represent disturbances in beams A and B caused by turbulence in the air flow is amplified by amplifiers 41 and 43, and passed through filters 45 and 47 to an analog correlator 49. The correlated data from the correlator 49 is inputed to an oscilloscope 51 for viewing. The oscilloscope 51 has a camera 53 for taking a photograph of the correlated data display. Another oscilloscope 53 is provided for viewing the raw data from the photodetectors.

Referring now to FIG. 2 which shows a front view of knife-edge 28 along the centerline of laser beam A. However, it should be obvious that the same figure could represent knife-edge 33 along centerline of laser beam B which functions identically. Since a turbulent air flow in the test section will have a change in its index of refraction, laser beams A and B will be deflected slightly by the turbulent air flow. Each deflection of the beam A or B is proportional to the component of the refractive index gradient which is perpendicular to the path of the beam. When a deflection of the beam occurs, the amount of light reaching the photodetector on the other side of the knife-edge 28 or 33 will be changed. The photodetector 35 or 37 converts this change into an AC electrical signal such that the signal is related to the respective laser beam deflection caused by a local gradient of the turbulence passing through the laser beam.

Because the refractive index of air is approximately proportional to its density, the output signal of the photodetector 35 or 37 is proportional to the change in the component of the density gradient which is perpendicular to the beam and to the knife edge 28. Assuming the knife edge 28 is perpendicular to the air flow direction, X direction shown in FIG. 2, the signal of either beam may be expressed by the following equation:

$$i(t) = S \cdot \beta_x(t) \quad (1)$$

where $i(t)$ is the signal.
S is the sensitivity of the system.
$\beta_x(t)$ is the beam deflection angle in the X-direction.

In FIG. 2, the beam A is shown in its undisturbed position and in a deflected position described by the beam deflector vector, $\Delta$. Let $\Delta$ and $\theta$ represent the magnitude and direction of $\overline{\Delta}$, respectively. Further, assume that the eye of the photodetector has a large area of constant sensitivity compared to the cross-sectional area of the laser beam and that no laser light falls outside of this area of constant sensitivity. If the intensity across the laser beam is assumed to be constant over the beam cross-section and that the knife-edge is straight, the relationship between the beam deflection vector and the photodetector as an electrical output can be simplified considerably.

Because of the area of sensitivity of the eye of the photodetector monitoring the fluctuating laser light is constant, the component of the beam deflection vector which is parallel to the knife-edge does not contribute to the output signal of the photodetector. The component of $\Delta$ which is perpendicular to the knife-edge will determine the amount of change in light reaching the photodetector. If the beam deflection is small compared to the diameter of the laser beam, the output signal, $i(t)$ can be expressed as a function of the component $\Delta_x$ which is perpendicular to the knife edge $$i(t) = \left[\frac{4\overline{I}_d}{\pi D}\right] \Delta_x(t) \quad (2)$$

where

D is the laser beam diameter.
$\overline{I}_d$ is the average current with knife-edge removed.

The first group of terms in brackets on the right-hand side of Equation 2 is the change in the output per unit change in $\Delta_x$ and is assumed to be constant, C.

$$i(t) = C \cdot \Delta_x(t) \quad (3)$$

For this case, the photodetector output is a linear function of the component of $\Delta$ which is normal to the knife-edge. This result is not unrealistic and can be approximated very well in practice.

Since $$\Delta_x(t) = (t) \cdot \cos \theta(t) \quad (4)$$

Equation 3 can be expressed as $$i(i) = C \cdot \Delta(t) \cdot \cos \theta(t) \quad (5)$$

Thus, it is apparent from Equation 5 that $i(t)$ is a function of the direction as well as the magnitude of the beam deflection vector.

For the system shown in FIG. 1, the signals from the photodetectors 35 and 37 monitoring the respective beams A and B are $$i_a(t) = C_a \cdot \Delta_a(t) \cdot \cos \theta_a(t) \quad (6)$$

and $$i_b(t) = C_b \cdot \Delta_b(t) \cdot \cos \theta_b(t) \quad (7)$$

The subscripts $a$ and $b$ refer to beams A and B respectively.

For purposes of simplicity, the turbulence can be assumed to be two-dimensional, i.e., the time averaged statistical properties do not vary along the laser beams. Relaxing of this assumption will not change the fundamental relationship between the disturbances in the two laser beams normal to the air flow.

The parallel laser beams are perpendicular to the air flow as indicated by FIG. 1 and separated by a distance $\xi$. The plane formed by the beams is such that flow disturbances passing through the upstream beam, beam A, at time $t$ also pass through the downstream beam, beam B, at a later time, $t+\tau$.

The cross-correlation of the two photodetector signals $i_a(t)$ with $i_b(t+\tau)$ is given by $$R(\xi, \tau) = \lim_{T \to \infty} \frac{1}{T} \int_0^T i_a(t) \cdot i_b(t+\tau) dt \quad (8)$$

By substituting Equations 6 and 7 into 8 and assuming that the integration time, T, is large enough the following equation is obtained:

$$R(\xi, \tau) = \frac{C_a C_b}{T} \int_0^T \Delta_a(t) \cdot \Delta_b(t+\tau) \cdot \cos \theta_a(t) \cos \theta_b(t+\tau) dt \quad (9)$$

FIGS. 3 and 4 show the knife-edge orientation for the cross-correlation of Equation 9. FIG. 3 illustrates the beam deflection vector of beam A at time $t$ when a particular disturbance is passing through the beam, and FIG. 4 illustrates the beam deflection vector of beam B at time $(t+\tau)$ when the same disturbance passes through that beam. When this disturbance passes through beam A, the beam is deflected in a direction $\theta_a$, and by a magnitude $\Delta_a$. This magnitude of the deflection vector is determined by the magnitude of the density gradient component normal to the beam characterizing the disturbance. The direction of the deflection is due to the particular orientation of the same density gradient component. By making the realistic assumption that the disturbance rotates as it travels downstream, its orientation will not necessarily be the same when it passes through beam B as it was when it passed through beam A. This is represented in FIGS. 3 and 4 when the beam deflection vector caused by a particular disturbance has rotated during its transit from beam A to beam B. It follows that $$|\Delta_a(t) \times \Delta_b(t+\tau)| = \Delta_a(t) \cdot \Delta_b(t+\tau) \cdot \sin\phi(t+\tau) \quad (10)$$

Equation 10 defines the angle $\phi$ through which the disturbance rotated during transit from beam A to beam B. Thus $$\theta(t+\tau) = \theta_a(t) - \theta_b(t+\tau) \quad (11)$$

Solving Equation 11 for $\theta_b(t+\tau)$ and substituting into Equation 9 gives $$R(\xi, \tau) = \frac{C_a C_b}{T} \int_0^T \Delta_a(t) \cdot \Delta_b(t+\tau)$$
$$\cdot \cos \theta_a(t) \cos [\theta_a(t) - \phi(t+\tau)] dt \quad (12)$$

For consideration of a simplified two-dimensional flow model where it is assumed that the disturbances are random and produce statistically stationary signals, the cross-correlation function as expressed by Equation 12 can be studied for two cases:

(a) where the disturbances do not rotate, and
(b) where each disturbance rotates through the same angle, $\phi$, during transit from beam A to B.

For case (a), FIGS. 5(a) to 5(d) show four knife-edge arrangements where the view is taken along the laser beams similar to that of FIGS. 3 and 4. The differences between these four figures is the orientation of the downstream knife-edge. If it is assumed that the disturbances do not rotate, them $$\phi(t+\tau) = 0 \quad (13)$$

and from Equation 11, the following is obtained:

$$\theta_b(t+\tau) = \theta_a(t) \quad (14)$$

The signal from beam A will be $$i_a(t) = C_a \cdot \Delta_a(t) \cdot \cos \theta_a(t) \quad (15)$$

and is the same for all four knife-edge arrangements.

The signal from beam A, for FIGS. 5(a), (b), (c) and (d) are $$i_{b1}(t+\tau) = C_b \cdot \Delta_b(t+\tau) \cdot \cos \theta_b(t+\tau) \quad (16)$$
$$i_{b2}(t+\tau) = C_b \cdot \Delta_b(t+\tau) \cdot \sin \theta_b(t+\tau) \quad (17)$$
$$i_{b3}(t+\tau) = C_b \cdot \Delta_b(t+\tau) \cdot \cos \theta_b(t+\tau) \quad (18)$$
$$i_{b4}(t+\tau) = -C_b \cdot \Delta_b(t+\tau) \cdot \sin \theta_b(t+\tau) \quad (19)$$

respectively.
By substituting Equation 14 into Equations 16, 17, 18 and 19, the cross-correlation functions for the respective knife-edge arrangements become.

$$R_1(\xi, \tau) = \left[\frac{C_a C_b}{T}\right] \int_0^T \Delta_a(t) \cdot \Delta_b(t+\tau) \cdot \cos \theta_a(t) \cdot \cos \theta_a(t) dt \quad (20)$$

$$R_2(\xi, \tau) = \left[\frac{C_a C_b}{T}\right] \int_0^T \Delta_a(t) \cdot \Delta_b(t+\tau) \cdot \cos \theta_a(t) \cdot \sin \theta_a(t) dt \quad (21)$$

$$R_3(\xi, \tau) = -\left[\frac{C_a C_b}{T}\right] \int_0^T \Delta_a(t) \cdot \Delta_b(t+\tau) \cdot \cos \theta_a(t) \cdot \cos \theta_a(t) dt \quad (22)$$

$$R_4(\xi, \tau) = -\left[\frac{C_a C_b}{T}\right] \int_0^T \Delta_a(t) \cdot \Delta_b(t+\tau) \cdot \cos \theta_a(t) \cdot \sin \theta_a(t) dt \quad (23)$$

The cross-correlograms for these arrangements are shown in FIGS. 6(a), (b), (c) and (d), respectively.

Figure 7B:
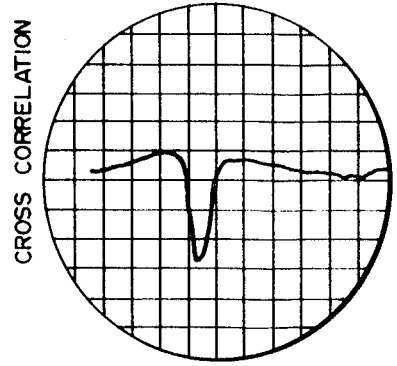

An example of such a cross-correlogram, represented by Equation 20, would be similar to that shown in FIG. 7a. A cross-correlogram to that represented by Equation 22 is shown in FIG. 7(b).

For Case b, it is assumed that each disturbance rotates through the same angle $\phi$ during transit from beam A to B, then $$\phi(t+\tau) = \phi \quad (24)$$

Expanding equation 12 and making the substitution from Equation 24, the following is obtained.

$$R(\xi, \tau) = \left[\frac{C_a C_b}{T}\right] \int_0^T \Delta_a(t) \cdot \Delta_b(t+\tau) \cdot \cos^2 \theta_a(t) \cdot \cos \phi dt$$
$$+ \left[\frac{C_a C_b}{T}\right] \int_0^T \Delta_a(t) \cdot \Delta_b(t+\tau) \cdot \cos \theta_a(t) \cdot \sin \theta_a(t) \cdot \sin \phi dt \quad (25)$$

Since $\phi$ is not a function of time, $\cos \phi$ and $\sin \phi$ can be taken aside of the integrals on the right-hand side of Equation 25, respectively.

$$R(\xi,\tau) = [\cos \phi]\left[\frac{C_a C_b}{T}\right] \int_0^T \Delta_a(t) \cdot \Delta_b(t+\tau) \cdot \cos^2 \theta_a(t) dt$$
$$+ [\sin \phi]\left[\frac{C_a C_b}{T}\right] \int_0^T \Delta_a(t) \cdot \Delta_b(t+\tau) \cdot \cos \theta_a(t) \cdot \sin \theta_a(t) dt \quad (2)$$

In Equation 26, the expressions in braces represents the cross-correlations derived for Case $a$. Substitution of Equations 20 and 21 into 26 yields $$R(\xi, \tau) = [\cos \phi] R_1(\xi, \tau) + [\sin \phi] R_2(\xi, \tau) \quad (27)$$

Equation 27 relates the cross-correlogram of Case $b$ to those of Case $c$. Thus from Equation 27 is obtained $$R(\xi, \tau) = R_1(\xi, \tau), \text{ for } \phi = 0 \quad (28)$$
$$R(\xi, \tau) = R_2(\xi, \tau), \text{ for } \phi = \pi/2 \quad (29)$$
$$R(\xi, \tau) = -R_1(\xi, \tau), \text{ for } \phi = \pi \quad (30)$$
$$R(\xi, \tau) = -R_2(\xi, \tau), \text{ for } \phi = (3/2)\pi \quad (31)$$

In Equation 27 the unknown quantity is the angle $\phi$. A direct measurement of $\phi$ for the idealized model in Case $b$ can be made by combining Case $a$ with Case $b$. This procedure is referred to herein as the method of "forced similarity" and is as follows:

(1) Compute the cross-correlogram $R(\xi, \tau)$ for zero beam separation with the relative knife-edges, orientation as shown in FIG. 3 ($\xi = 0$). Since $\phi = 0$ for $\xi = 0$, $$R(0, \tau) = R_1(0, \tau) \quad (32)$$

(2) Separate the two beams by moving beam B downstream a known distance $\xi$ from beam A. The position and knife-edge angle of beam A is not changed ($\psi_a = 0$).

(3) Rotate the downstream knife-edge, B, to the angle $\psi_{bm}$ which produces the same "shape" of the cross-correlogram as was computed for the zero beam separation. The angle $\psi_{bm}$ corresponding to the maximum "degree of similarity" between these cross-correlograms is equal to the angle $\phi$ through which the disturbances rotate during transit from beam A to beam B. The "forced similarity" condition is $$R(\xi, \tau - \tau_m, \psi_b) = K(\xi, \tau, \psi_b) \cdot R(0, \tau) \quad (33)$$

where $$K(\xi, \tau, \psi_b)$$

is "optimum" when $\psi_b = \psi_{bm}$ for a particular $\xi$, subscript $m$ designates most probable maximum.

(4) The most probable transit time, $\tau_m$, of the disturbances is determined by the time delay on the cross-correlogram for separated beams corresponding to the similar position at zero time delay on the cross-correlogram for zero beam separation.

(5) The most probable speed of the disturbances, $<U>$, is $$<U> = \xi \tau_m \quad (34)$$

(6) The most probable angular velocity, $<\omega_p>$, is $$<\omega_p> = \phi \tau_m = \psi_{bm} \tau_m \quad (35)$$

PRACTICAL APPLICATION

As a consequence of the proposed relation between the skewness of the cross-correlogram and the rotational motion of the disturbances, the "forced similarity" condition, Equation 33 must be imposed in order to determine the most probable transit time, $\tau_m$, as well as all other statistical properties which are computed from the shape of the cross-correlogram in the neighborhood of $\tau_m$. Imposing this condition analytically involves normalization of the cross-correlogram and optimization of the similarity function $K(\xi, \tau, \psi_b)$.

Figure 8:
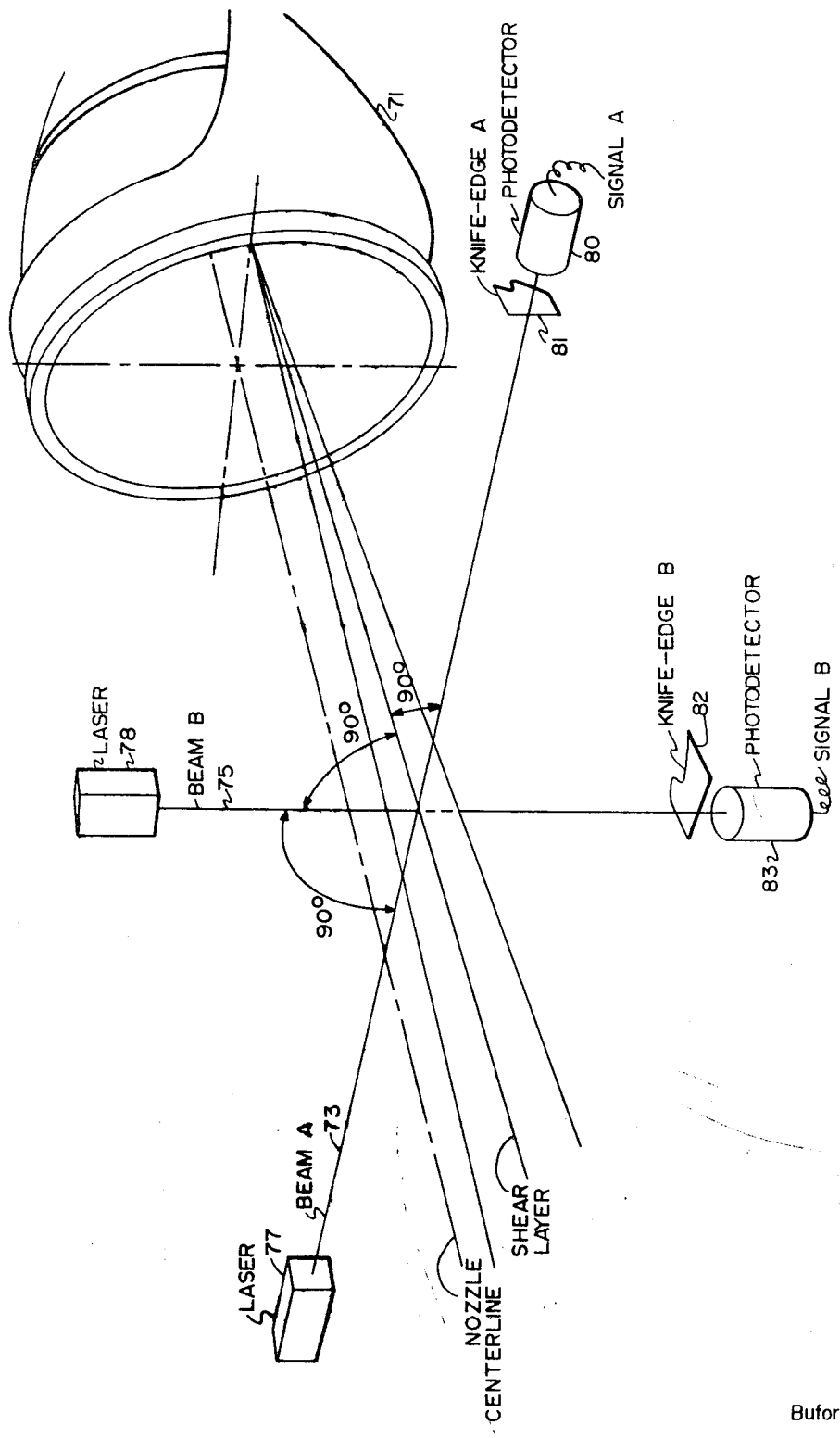
FIG. 8 is a schematic of a cross-beam apparatus layout for determining disturbances passing through a localized supersonic region.

For a practical application of this discovery, FIG. 8 shows a schematic of the free jet shear layer of a supersonic axissymmetric air jet from a nozzle 71. Two laser beams 73, 75 (A and B) from sources 77 and 78 are directed through the flow perpendicular to one another in such a manner that the plane formed by the beams 73, 75 is perpendicular to the centerline of the jet. The horizontal beam 73 (beam A) passes through the center of the jet and its deflections are detected by knife-edge 82 and photodetector 83. The vertical beam 75 (beam B) passes through the jet shear layer and intersects the horizontal beam 73 (beam A) and its deflections are detected by knife-edge 81 and photodetector 80.

It is now known that the statistical cross-correlation of the signals from two such crossing beams 73, 75 should result in a cross-correlogram representative of the components of the signals which are caused by disturbances passing through the localized region about the beam intersection. That is, flow disturbances passing through the beam that are not common to both beams do not contribute significantly to the cross-correlogram (the integration time being sufficiently long).

Referring again to FIG. 8, the "forced similarity" condition may be satisfied for retrieving all three components of the most probable preferred angular velocity, $<\omega_p>$ of the disturbances passing through a localized region of the shear layer. The practical procedure is as follows:

(1) The beams 73, 75 are directed through the turbulence as shown in FIG. 7 with zero beam intersection ($\xi=0$). The knife-edges 81, 82 are positioned as shown ($\psi_a=0$, $\psi_b=0$).

(2) The cross-correlation $R(0, \tau)$ is computed.

Figure 9:
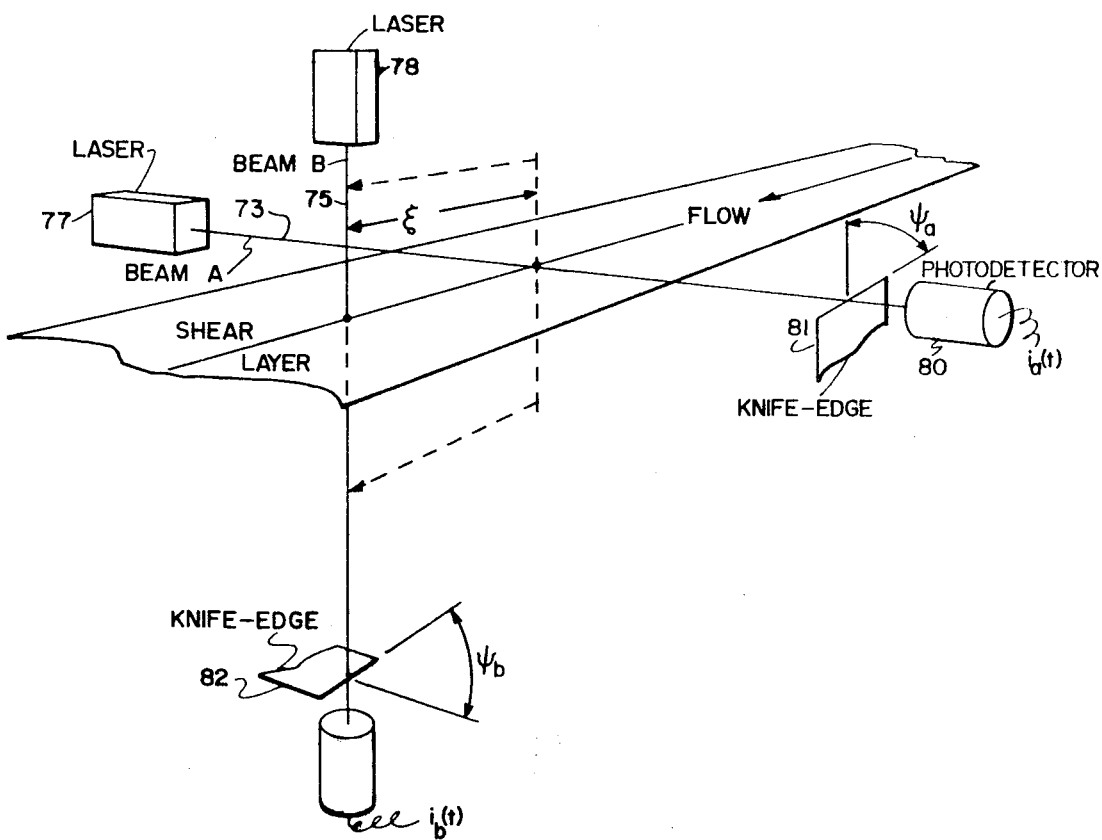
FIG. 9 is a schematic of the cross-beam apparatus of FIG. 8 with the laser beams separated.

(3) The vertical beam 75 (beam B) is moved downstream a distance $\xi$ as shown in FIG. 9, and the cross-correlogram $R(\xi, \tau)$ is computed which satisfies the "forced similarity" condition $$R(\xi, \tau-\tau_m, \psi_{am}, \psi_{bm}) = K(\xi, \tau, \psi_{am}, \psi_{bm}) \cdot R(0, \tau) \quad (36)$$

for axissymmetric flows. Experimentally this involves rotation of both the knife edges 81, 83. When this step is completed the condition should be satisfied for this particular flow.

(3) If necessary, the next step would be to rotate the downstream beam 75 (FIG. 9) in the plane perpendicular to the centerline of the jet. This is done in increments and step (3) is repeated for each increment until all three angles $\psi_{am}$, $\psi_{bm}$, $\psi_{cm}$ have been determined which satisfy the three dimensional similarity condition $$R(\xi, \tau-\tau_m, \psi_{am}, \psi_{bm}, \psi_{cm}) = K(\xi, \tau, \psi_{am}, \psi_{bm}, \psi_{cm}) \cdot R(0, \tau) \quad (37)$$

where $\psi_c$ is the angle of rotation of the vertical beam.

(5) The most probable transit time, $\tau_m$, of the disturbance is determined by evaluating the similarity condition (41) for $\tau=0$.

$$R(\xi, 0-\tau_m, \psi_{am}, \psi_{bm}, \psi_{cm}) = \frac{R(0, 0)}{K)\xi, 0, \psi_{am}, \psi_{bm}, \psi_{cm})} \quad (38)$$

Thus, $\tau_m$ is equal to the time delay on the cross-correlogram $R(\xi, \tau, \psi_{am}, \psi_{bm}, \psi_{cm})$ corresponding to the similar positions at zero time delay on the cross-correlogram for zero beam separation.

(6) The components of the most probable preferred angular velocity, $<\omega_p>$, are $$<\omega_x> = \psi_{cm}/\tau_m \quad (39)$$

$$<\omega_y> = -\psi_{am}/\tau_m \quad (40)$$

$$<\omega_z> = \psi_{bm}/\tau_m \quad (41)$$

and the vector is given by $$<\omega_p> = i<\omega_x> + j<\omega_y> + k<\omega_z> \quad (42)$$

The most probable speed of transit, $>U<$, is $$<U> = \xi/\tau_m \quad (43)$$

Figure 10:
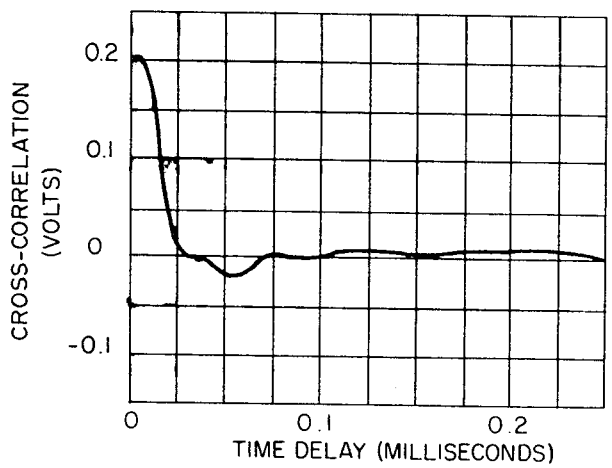
FIGS. 10(*a*) and 10(*b*) show the cross-correlogram for the apparatus of FIG. 8 (positive and negative time delay, respectively)
Figure 10:
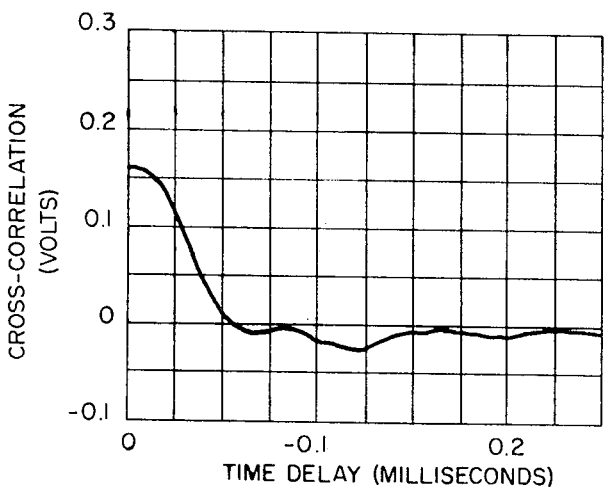
Figure 11:
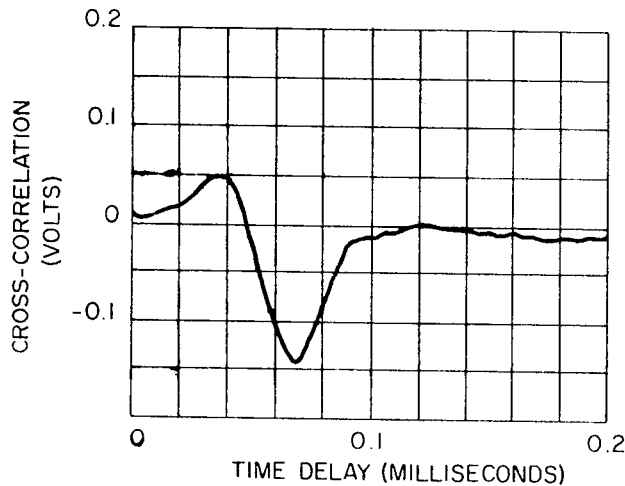
FIG. 11 shows a cross-correlogram for the apparatus of FIG. 9 with a beam separation of one inch.

FIGS. 10 and 11 show cross-beam measurements made in the supersonic free shear layer of an axissymmetric jet. The exit Mach number of the nozzle was 2.5 and the expansion was optimum.

In FIGS. 10a and 10b, the positive and negative regions of the cross-correlogram are shown. The beam geometry is shown in FIG. 8 ($\xi=0$). It can be seen that the correlogram is not symmetric about the origin ($\tau=0$), but that there is a dominant peak (at $\tau=0$). The cross-correlogram corresponds to $R(0, \tau)$ in Equation 40.

FIG. 11 shows the cross-correlogram for a beam separation of one inch ($\xi=1''$) with the knife-edges in the same positions as in FIG. 10 ($\psi_a=0$, $\psi_b=0$). The fact that there is considerable difference in the shapes of these correlograms satisfies one necessary condition required by the theory of "forced similarity" discussed hereinbefore.

FIG. 12 shows four cross-correlations computed from signals retrieved with a laser schlieren system described with reference to FIG. 1. The data was retrieved from the supersonic ($M=2.0$) turbulent boundary of the thin plate 25. The beams, beam A and beam B, were separated by 1.54 inches in the direction of flow and were approximately ⅛ inch above the surface of the plate 25. These cross-correlograms were computed with the downstream knife edge orientations shown in FIG. 12. This data shows that the orientation of the knife-edge relative to each other and the flow does influence the shape of the cross-correlogram.

Figure 13:
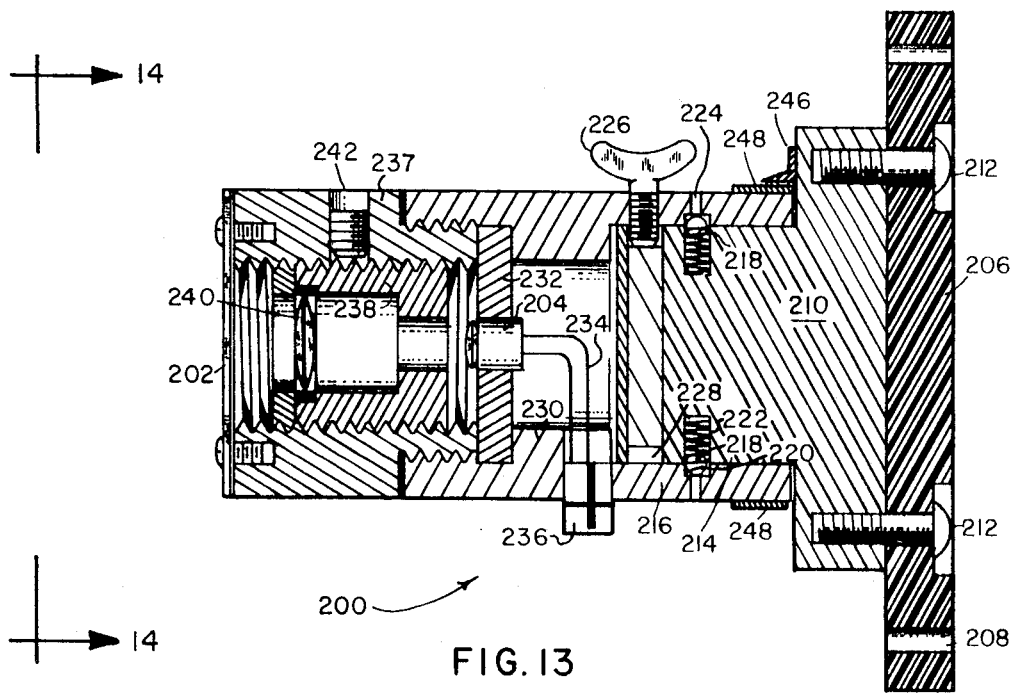
FIG. 13 is a cross-sectional view of the mount for the photodiode and knife-edge.
Figure 14:
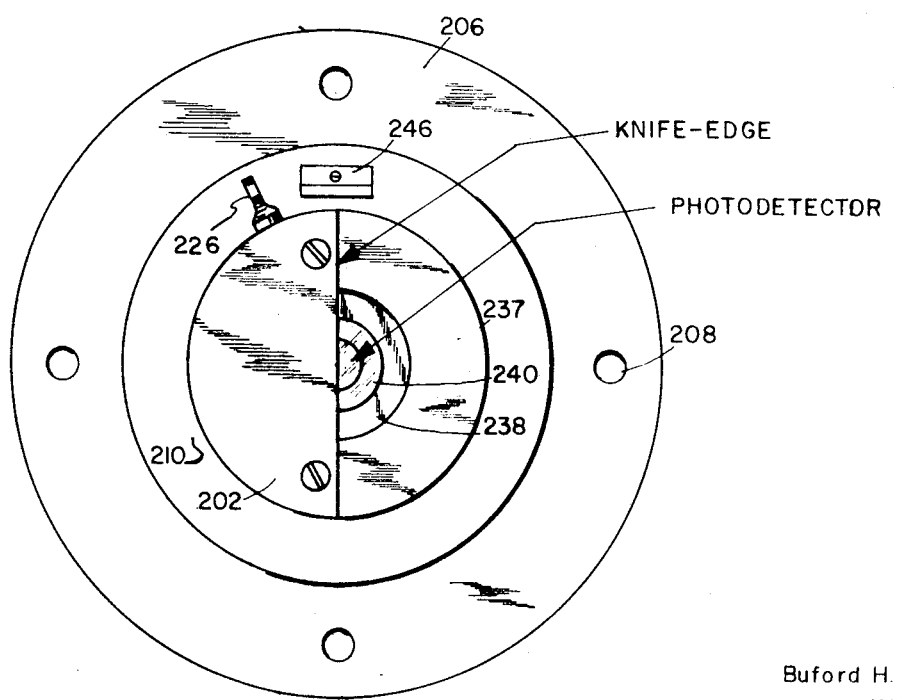
FIG. 14 is a front view of the mount of FIG. 13.

FIGS. 13 and 14 illustrate a suitable apparatus 200 for supporting the knife-edge 202 and photodetector 204 relative to each other. The apparatus 200 is very useful for viewing the deflections of the laser beam because most photodetectors will not have the same light sensitivity over its entire surface. With the apparatus shown, the photodetector 204 will rotate with the knife-edge 202 assuring that the same light sensitivity surface of the photodetector will be receiving the laser deflections at all times.

The apparatus 200 has a base of dielectric material 206 adapted for mounting on a wall or the like by fasteners extending through holes 208 near the circumference. A cylindrical member 210 is secured to the base by bolts 212 and the cylindrical member 210 has a forwardly extending middle portion 214. A central tubular sleeve 216 is slipped over the middle portion 214 and is adapted to rotate thereon. The sleeve 216 is held onto the middle portion 214 by spring biased balls 218 which extend into a recess 220 extending about the sleeve's internal circumference. Small holes 222 enable the balls 218 to be depressed into the middle portion by inserting a tool through holes 224 whereby the sleeve 216 may be removed.

Also, a thumb screw 226 is threaded through the tubular sleeve 216 which may be tightened against the middle portion 214 to prevent any rotation. The thumb screw 226 fits into a groove 228 extending about the circumference of the middle portion 214 adjacent its forward end to prevent any forward sliding of the sleeve 216 when not tight against the middle portion surface, yet allow for rotation.

The tubular sleeve 216 has a center portion 230 projecting inwardly to form a stop for a circular disk 232 which abuts thereagainst. The disk 232 supports the photodetector 204 at its center, shown as a photodiode, with electrical connecting wires 234 extending to a connector 236 secured and extending through the tubular sleeve 216.

A front tubular sleeve 237 is threaded internally of the central sleeve 216 tight against the disk 232. The front sleeve 236 is also internally threaded to hold another short tubular sleeve 238 which carries a lens 240 adjacent its forward end. The lens 240 focuses the laser beam onto the light sensitivity surface of the photodetector 204. A set screw 242 is provided to prevent rotation of the short sleeve 238 once correctly positioned.

The knife-edge 202 is secured by screws 244 to the forward end of the front sleeve 237. The knife-edge 202 blocks approximately 50 percent of the laser beam so its deflections can be determined as explained hereinbefore.

An indicator 246 is secured to the exposed portion of the cylindrical member 210 and a scale 248 in degrees extends about the rear portion of the central tubular sleev 216 whereby the position of the sleev 216 may readily be determined.

Hence, it should now be evident that it has been discovered that supersonic turbulence can be measured and its characteristics determined by properly correlating the Schlieren effects of the wind flow on two laser beams. Obviously, many modifications and variations of the invention are now possible in view of this discovery. For example, the two laser sources could be replaced with a single laser source using a beam splitter and mirrors.

What is claimed is:

1. A method of determining the characteristics of supersonic turbulent flows, comprising:
   projecting a first beam of collimated light along a first known path through said flow so the turbulence within said flow will cause deflections of said first light beam,
   detecting the deflections of said first light beam,
   projecting a second beam of collimated light along another known path of said flow so that the turbulence that caused deflections in the first beam of light will cause deflections in the second beam of light at a later time,
   detecting the deflections of said second light beam at a different angle than the deflections of said first light beam, and
   correlating the characteristics of the deflections of said first and second light beams for substantial similarity whereby said turbulence is identified and its characteristics may be determined.

2. A method accordng to claim 1, including:
   said detecting of the first light beam is with a knife-edge blocking a portion of the light at a known angle, and
   said detecting of the second light beam is with a knife-edge blocking a portion of the light at an angle different than the other knife-edge whereby rotation characteristics of said turbulence between said two light beams may be determined.

3. A method according to claim 2 wherein said beams of light are from al aser source.

4. A method according to claim 1 wherein said beams of light are cross positioned so only a small comomn volume of the air flow intersects both beams.

5. A method according to claim 1 wherein said beams are parallel.

6. An apparatus for determining the characteristics of turbulent flows comprising:
   a first light source projecting a first collimated beam of light along a first known path through said turbulent flow whereby turbulence within said flow will cause deflections in the light beam;
   a first knife-edge for blocking a portion of said first light beam after its exit from the turbulent flow,
   a first photodetector for receiving the unblocked portion of the light from the first knife edge, and converting changes in the light intensity into electrical signals,
   a second light source projecting a second collimated beam of light along a known path whereby the turbulence that causes deflections in the first beam of light will cause deflections in the second beam of light at a later time,
   a second knife-edge for blocking a portion of said second light beam after its exit from the turbulent flow,
   a second photodetector for receiving the unblocked portion of the light from the second knife-edge, and converting changes in the light intensity into electrical signals, and
   means for correlating the characteristics of the electrical signals from said first and second photodetectors for substantial similarity whereby said turbulence is identified and its characteristics may be determined.

7. An apparatus according to claim 6 wherein said means for correlating the electrical signals include an oscilloscope for viewing the correlated signal.

8. An apparatus as defined by claim 6 wherein:
   said first knife-edge and first photodetector are mounted by a first housing means for rotating both together relative to the first collimated beam of light; and
   said second knife-edge and second photodetector are mounted by a second housing means for rotating both together relative to the second collimated beam of light.

9. An apparatus as defined by claim 8 wherein each said housing means comprises:
   a base of dielectric material adapted for mounting on a wall,
   a cylindrical member secured to the base, said member having a forwardly extending cylindrical middle portion,
   a central tubular sleeve slipped over said cylindrical middle portion and extending forwardly therefrom,
   means for securing said tubular sleeve to said cylindrical middle portion which permits rotation thereof as well as preventing rotation thereof,
   a disk means for mounting one of said photodetectors within said central tubular sleeve,
   a front tubular sleeve partially threaded internally within said threaded sleeve and against said disk means,
   a short tubular sleeve threaded internally within said front tubular sleeve,
   a long supported within said short tubular sleeve for focusing one of said light beams onto the photodetector mounting within said disk, and
   one of said knife-edges secured to the forward end of said front tubular sleeves so as to cover one-half of its internal opening.

10. A method of determining the characteristics of turbulent flows, comprising:
    projecting a first beam of collimated light along a first known path through said flow so the turubulence within said flow will cause schlieren deflections of said first light beam,
    detecting the schlieren deflections of said first light beam,
    projecting a second beam of collimated light along another known path through said flow so that the turbulence that caused deflections in the first beam of light will cause schlieren deflections in the second beam of light at a later time,
    detecting the schlieren deflections of said second light beam, and
    correlating the characteristics of the schlieren deflections of said first and second light beams for substantial similarity whereby said turbulence is identified and its characteristics may be determined.

11. A method according to claim 10, including:
said detecting of the first light beam includes placing a knife-edge to block a portion of that light at a known angle, and
said detecting of the second light beam includes placing a knife-edge to block a portion of that light at a known angle.

12. A method according to claim 10, wherein said beams of light are from a pair of laser sources.

13. A method according to claim 10 wherein said beams of light are cross positioned so only a small common volume of the air flow intersects both beams.

14. A method according to claim 10 wherein said beams of light are parallel.

References Cited

UNITED STATES PATENTS

| | | | |
|---|---|---|---|
| 2,679,183 | 5/1954 | Buchele et al. | 73—147 |
| 3,101,414 | 8/1963 | Grabowsky | 356—129 |
| 3,531,204 | 9/1970 | Holland et al. | 356—129 |

S. CLEMENT SWISHER, Primary Examiner

U.S. Cl. X.R.

73—432 L; 356—129